United States Patent
Reisenhofer et al.

(10) Patent No.: US 6,869,211 B2
(45) Date of Patent: Mar. 22, 2005

(54) SCREW-TYPE EXTRUDER

(75) Inventors: Dieter Reisenhofer, Hirtenberg (AT); Hans Schoenmaker, Rijssen (NL)

(73) Assignee: Cincinnati Extrusion GmbH, Wein (AT)

( * ) Notice: Subject to any disclaimer, the term of this patent is extended or adjusted under 35 U.S.C. 154(b) by 111 days.

(21) Appl. No.: 10/348,897

(22) Filed: Jan. 23, 2003

(65) Prior Publication Data

US 2003/0137894 A1 Jul. 24, 2003

(30) Foreign Application Priority Data

Jan. 24, 2002 (AT) .......................................... A 118/2002

(51) Int. Cl.[7] .............................. B01F 7/08; B29B 7/14; B29B 7/20
(52) U.S. Cl. ............................... 366/75; 366/79; 366/85
(58) Field of Search ............................. 366/85, 79, 83, 366/84, 88, 89, 75; 425/208

(56) References Cited

U.S. PATENT DOCUMENTS

| | | | | | |
|---|---|---|---|---|---|
| 3,266,097 A | * | 8/1966 | Larsen | ........................ | 366/79 |
| 3,572,646 A | * | 3/1971 | Kocher | ........................ | 366/89 |
| 3,888,469 A | * | 6/1975 | Geyer | ........................ | 366/79 |
| 4,425,044 A | * | 1/1984 | Kurtz et al. | ................... | 366/79 |
| 4,746,220 A | * | 5/1988 | Sukai et al. | ................... | 366/79 |
| 5,130,070 A | * | 7/1992 | Martin | ........................ | 366/75 |
| 5,350,231 A | * | 9/1994 | Eigruber | ....................... | 366/85 |
| 5,458,475 A | * | 10/1995 | Suumen | ....................... | 425/208 |
| 6,129,873 A | * | 10/2000 | Shelby et al. | .................. | 366/89 |

FOREIGN PATENT DOCUMENTS

DE           68 377        8/1969
EP        0 595 190 B1    4/1997

OTHER PUBLICATIONS

Derwent Abstract of DD 68377 A, Derwent ACC–NO 1983–808283, Copyright 1999 Derwent Information LTD, 2 pages.*

* cited by examiner

*Primary Examiner*—Tony G. Soohoo
(74) *Attorney, Agent, or Firm*—Young & Thompson

(57) ABSTRACT

An extruder for processing of thermoplastics has a housing (1) in which a screw is pivotally supported. A land (5) which runs in a helical line protrudes from the core (4) of the screw. There is at least one ventilation opening in the housing in which the screw is pivotally supported. The land (5) of the screw at least in the area of the ventilation opening has an active flank, i.e. one which points toward the discharge end of the extruder and which encloses with the axis of the screw an acute angle such that at least in areas it is set back relative to a radial plane which passes through the outside edge (14) of the active flank (10). This prevents the plastic which is to be processed in the extruder from being pressed to the outside and clogging the ventilation opening.

20 Claims, 2 Drawing Sheets

Figure 1:
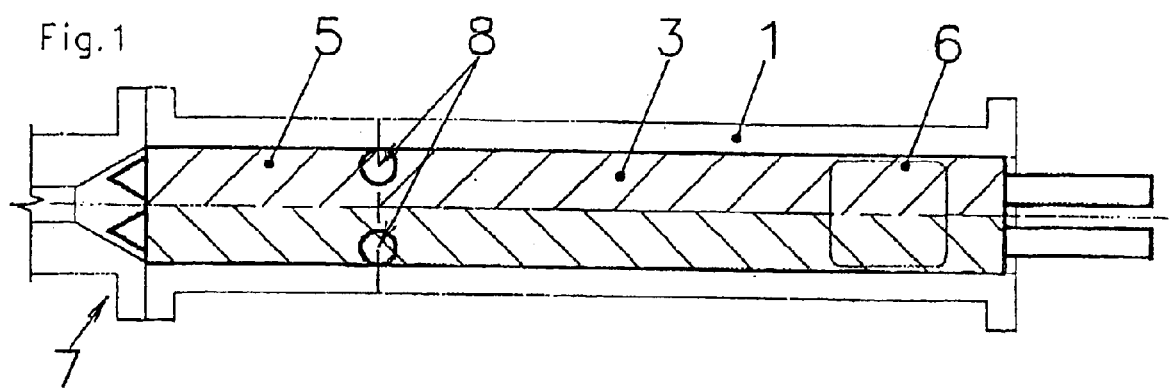

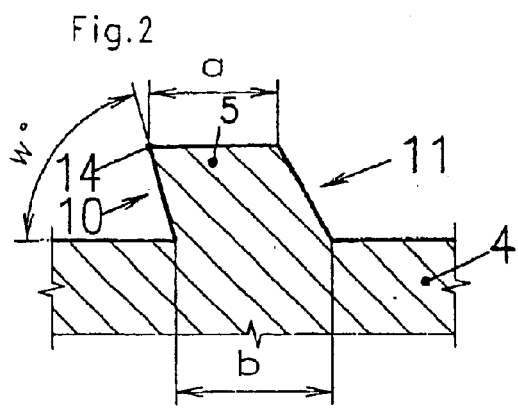
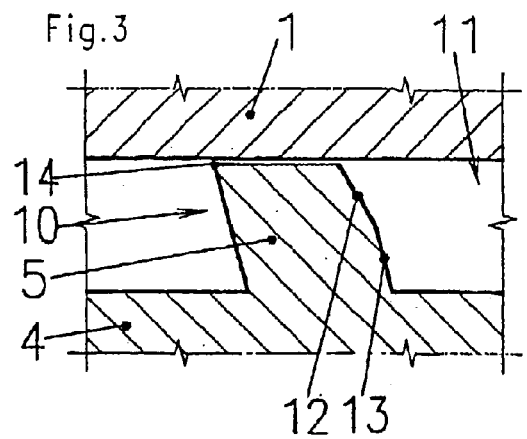
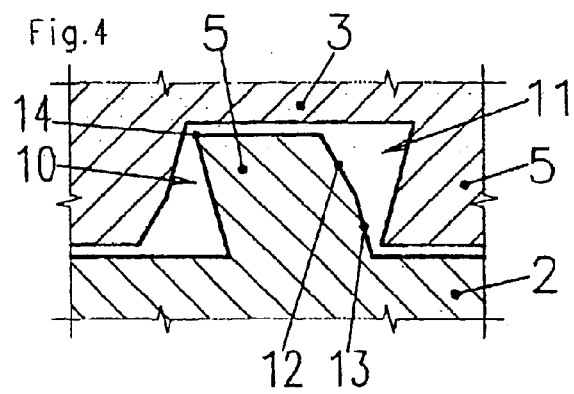
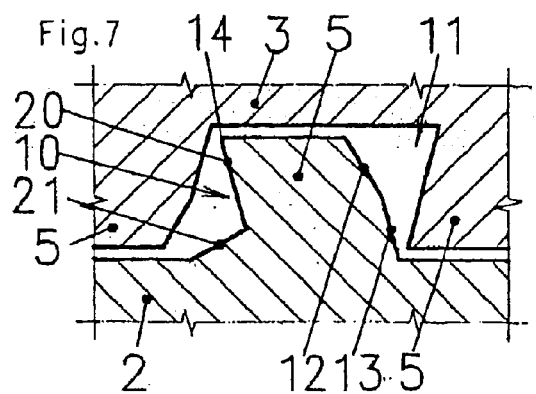
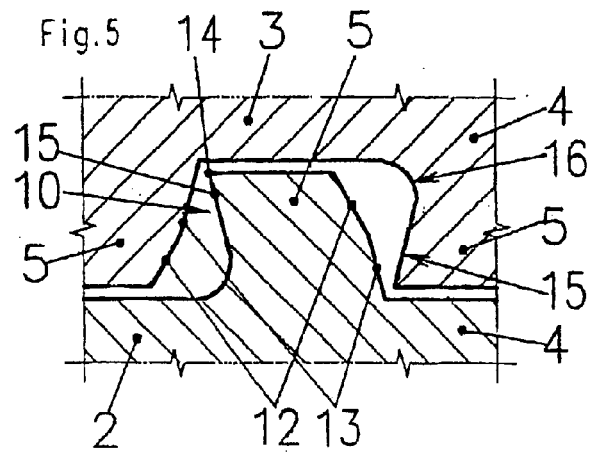
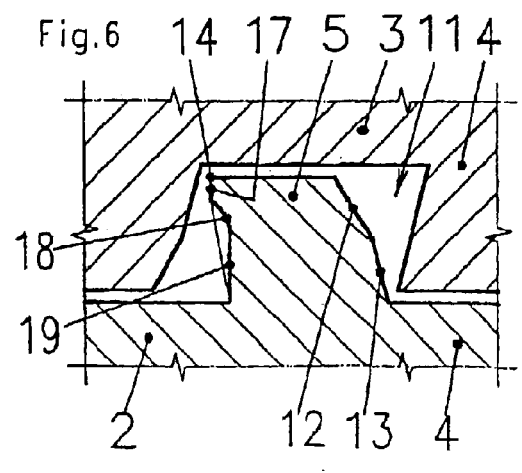

SCREW-TYPE EXTRUDER

The invention relates to an extruder with a housing in which at least one screw is pivotally supported, with a land which runs in a helical line protruding from its screw core, there being at least one ventilation opening in the housing.

These extruders have a housing in which one screw or two screws which mesh with one another are held. The housing has a delivery opening for the material to be processed in the extruder (for example, a plastic, optionally a thermoplastic) and in the vicinity of the discharge end of the extruder at least one ventilation opening ("ventilation hole").

The term "extruder" here means all conventional plasticizing devices, extrusion presses, injection molding machines and the like which are equipped with one or two screws which are next to one another and which mesh with one another.

EP 0 595 190 B1 discloses a double screw extruder with screws which have lands which have a trapezoidal cross section which widens from the base body of the screw to the outside.

In this way the forces which press the two screws of the known screw extruder apart during operation will be reduced.

DD 68377 A discloses a screw for cold feed of extruders which are equipped with lands which are arranged negatively in their angle from the screw body to the inside wall of the cylinder. Impetus for using this screw geometry for the actual extruder cannot be taken from DD 68377 A.

The object of the invention is to devise an extruder of the initially mentioned type in which at least one screw, especially in the area of at least one ventilation opening of the extruder housing, is made such that the material to be processed in the extruder is not pushed to the outside and thus the danger of the ventilation opening being displaced is reduced.

As claimed in the invention, this is done with an extruder which is characterized in that at least in the area of at least one ventilation opening the land of the screw has an active flank which is set back at least in areas relative to a radial plane which passes through the outside edge of the active flank.

Preferred and advantageous embodiments of the extruder as claimed in the invention are the subject matter of the dependent claims.

The object as claimed in the invention is advantageously achieved in that in the extruder as claimed in the invention at least one screw which is pivotally supported in the extruder housing at least in the area of at least one ventilation hole has an active flank which encloses with the axis of the screw an acute angle.

Here the "active flank" of the land of at least one screw is defined as the flank which points forward relative to the direction of conveyance of the material through the extruder, i.e. toward the discharge end of the extruder.

In the invention the active flank of the land has an alignment which is chosen such that the active flank relative to the outside edge of the screw land which points forward at least in areas is set back away from this outside edge of the screw land.

In one embodiment, the extruder as claimed in the invention is characterized in that the active flank has a radially outside segment which with the axis of the screw encloses an acute angle, and that the segment of the active flank which lies radially inside is concavely shaped. This embodiment has the advantage that the effect which is desired as claimed in the invention occurs especially reliably. In this embodiment it can be provided as claimed in the invention that the radially outside segment of the active flank passes via a radius into a segment which is essentially perpendicular to the axis of the screw. Thus favorable flow conditions are achieved and in the vicinity of the core of the screw no areas form which hinder the flow of material.

If according to one proposal of the invention it is provided that the active flank of the land of the screw has segments which with the axis of the screw enclose different angles, the affect of the execution of the screw land as claimed in the invention can be easily matched to the extruder application intended at the time. Here it is preferred if the radially outsider segment of the active flank with the axis of the screw encloses an acute angle and the radially inside segment of the active flank with the axis of the screw encloses an obtuse angle. It is especially preferred if the obtuse angle which is enclosed by the radially inner segment with the axis of the screw is 110° to 160°, especially 130° to 140°.

Within the framework of the invention it can be provided that the passive flank has segments which with the axis of the screw enclose different obtuse angles. Here it is preferable that the outside segment of the passive flank encloses with the axis of the screw a larger obtuse angle than the inside segment of the passive flank. These alignments of the passive flank to the position of the screw of the extruder of the invention advantageously emphasize the advent of the effect desired by the invention.

Other details, features and advantages of the extruder as claimed in the invention derive from the following description of preferred embodiments using the drawings.

Figure 8:
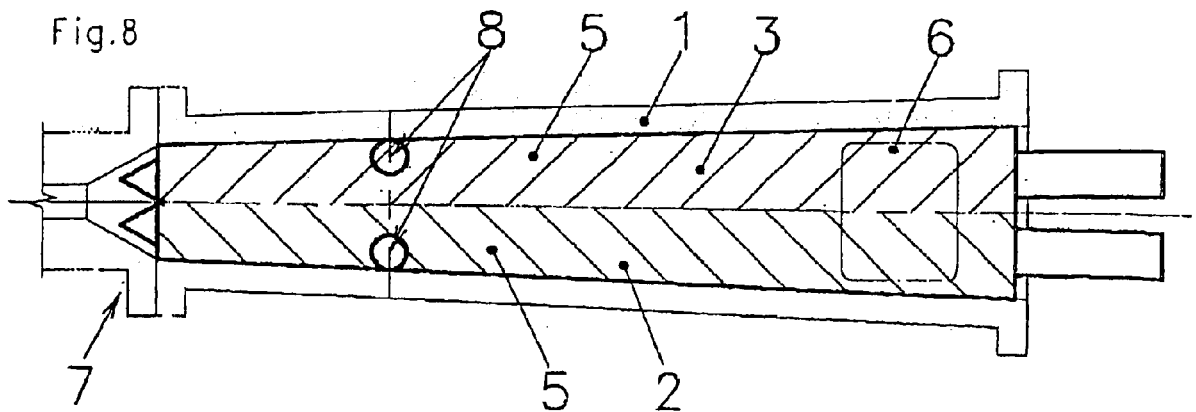

FIG. 1 schematically shows an extruder with two screws as claimed in the invention, FIG. 2 shows in an axial section the execution of the land of the screws in the area of the ventilation openings, FIG. 3 shows in a section another embodiment of the land of the screw in the extruder as claimed in the invention, FIG. 4 shows in an axial section the interfitting lands of the screws as shown in FIG. 3, FIG. 5 shows in a representation analogous to FIG. 4 another embodiment of the land of the screws, FIG. 6 shows in a representation analogous to FIG. 4 another embodiment of the land of the screws, FIG. 7 shows in a representation analogous to FIG. 4 another embodiment of the land of the screws, FIG. 8 shows in a schematic a double screw extruder with a conical housing and conical screws.

The double screw extruder shown in FIG. 1 has a housing 1 in which two screws 2 and 3 are pivotally supported. The screws 2, 3 consist of a core 4 and one land 5 each which runs in a helical line and which protrudes to the outside from the core.

In the housing 1 there is a delivery opening 6 for the material which is to be processed in the extruder and which is conveyed from the delivery opening 6 to the discharge end 7 of the extruder and is plasticized in doing so. At a distance from the discharge end 7 of the extruder in the housing 1 in this embodiment there are two ventilation openings 8.

In the embodiment of the shape of the land 5 of the screws 2, 3 which is shown in FIG. 2 the land 5 has an active flank 10 which encloses with the axis of the screw 2, 3 an acute angle "W°". The passive flank 11 of the land 5 encloses an obtuse angle with the axis of the screw 2, 3.

The acute angle W° can be between 45° and (almost) 90°. Values of the angle W° between 60° and 85°, especially 75°, are preferred.

In the embodiment shown in FIG. 2 the angle W° at which the active flank 10 is located to the axis of the screw 2, 3 and the angle which the passive flank 11 encloses with the axis of the screw 2, 3 are chosen such that the land 5 tapers to the outside away from the core 4 of the screw 2, 3, i.e. the width "b" of the land 5 in the area of the root of the land 5 is greater than the width "a" on the free end of the land 5.

In the embodiment shown in FIGS. 3 and 4, the land 5 has a cross sectional shape which likewise tapers from the inside to the outside, in this example the passive flank 11 being angled, and has an outer segment 12 which encloses with the axis of the screw 2, 3 a greater obtuse angle than the radially farther inside segment 13 of the passive flank 11. This yields the contour of the interfitting lands 5 of the two screws 2, 3 of the extruder as claimed in the invention, which contour is shown in FIG. 4.

In the embodiment shown in FIG. 5, the active flank 10 has a straight segment 15 which passes with a radius 16 into the outside surface of the core 4 of the screw 2, 3. The passive flank 11 is made in the embodiment shown in FIG. 5 in the manner as has been explained using FIG. 3, i.e. it has two segments 12, 13 which are tilted at different obtuse angles to the axis of the screw 2, 3.

In the embodiment shown in FIG. 6, the active flank 10 has a radially outer segment 17 which with the axis of the screw 2, 3 encloses an acute angle. The radially outer segment passes with a radius 18 into the radially inner segment 19 which extends as far as the core 4 of the screw 2, 3 and which in this embodiment encloses an angle of 90° with the axis of the screw 2, 3. The segment 19 of the active flank 10 can also include with the axis of the screw 2, 3 an angle not equal to 90°, for example an acute angle (W°).

In the embodiment of the land 5 of the screws 2 and 3 which is shown in FIG. 7, the passive flank 11 is made in the manner described using FIG. 3. The active flank 10 of the embodiment of FIG. 7 has an outer segment 20 and an inner segment 21 which both are made straight in the axial section and enclose different angles with the axis of the screws 2, 3. In the embodiment of FIG. 7 the outer segment 20 of the active flank 5 is at an acute angle W° to the axis of the screws 2, 3, conversely the inner segment 21 encloses an obtuse angle, for example an angle of 135°, with the axis of the screws 2, 3.

The different embodiments of the active flank 10 which are described using FIGS. 2 to 7 on the one hand and of the passive flank 11 on the other can in principle be combined with one another as desired.

The examples for the cross sectional shapes of the land 5 of the screws 2, 3 in the extruder as claimed in the invention which have been explained using FIGS. 2 to 7 show that it is important for the execution of the land 5 of at least one screw 2, 3 of the extruder as claimed in the invention for the active flank 10, therefore the flank 10 of the land 5 which points toward the screw tip, to be set back towards the screw end at least in areas relative to the radial plane which passes through the front outside edge 14 of the active flank 5, which edge therefore points toward the screw tip. This yields the advantageous effect that the material which is to be processed in the extruder and which is conveyed from the delivery opening 6 to the discharge end 7 of the extruder is not pressed to the outside in the area of the ventilation openings 8 so that the danger of the ventilation opening being displaced is avoided.

As is shown in FIG. 8, the configuration of the land 5 of the screws 2, 3 as claimed in the invention in the extruder can also be used for extruders with a housing which tapers conically from the delivery opening to the discharge end.

In the simplest case the active flank of the land is tilted at an angle of (almost) 90° to 45°, preferably at an angle of 85° to 60°. For certain applications an angle of roughly 75° has proven especially favorable.

The execution of the active flank of the land can have different shapes. Thus the active flank viewed in an axial section can be for example straight or in the axial section aligned straight and to the axis of the screw at an obtuse angle, for example roughly 135°.

The active flank can have an outer area in which viewed in an axial section it is aligned perpendicular to the axis of the screw and in the area which is farther inside can be at an acute angle to the axis.

The base area of the active flank can be rounded (therefore made with a "radius").

An embodiment is also possible in which the active flank of the screw of the extruder as claimed in the invention viewed in the axial direction has a concave shape at least in areas. Here it can be provided that the active flank in its outermost area (again viewed in the axial section) has a segment which is at an acute angle to the axis of the screw and which adjoins a concavely shaped segment which passes into a segment which leads toward the core of the screw and which is perpendicular to the axis of the screw (viewed in a section).

The "passive flank" of the land of at least one screw of the extruder as claimed in the invention, which passive flank is opposite the active flank, encloses with the axis preferably an obtuse angle, and here it can be provided that the passive flank has segments with different alignment, for example, angle to the axis of the screw.

In all embodiments it is preferred that the land of the screw provided in the extruder as claimed in the invention tapers to the outside so that the screw has a land (especially in the area of the ventilation zone) which is wider in the area of the core of the screw than on its free edge.

It should be pointed out that the described possible executions of the land 5 of the screws 2 and 3 of the extruder can also be implemented in a single screw extruder.

In summary, one embodiment of the invention can be described as follows:

An extruder for the processing of thermoplastics has a housing 1 in which a screw is pivotally supported. A land 5 which runs in a helical line protrudes from the core 4 of the screw. In the housing 1 in which the screw is pivotally supported there is at least one ventilation opening. The land 5 of the screw at least in the area of the ventilation opening has an active flank, i.e. one which points toward the discharge end of the extruder, and which encloses with the axis of the screw an acute angle such that it is set back at least in areas relative to the radial plane which passes through the outside edge 14 of the active flank 10. This prevents the plastic which is to be processed in the extruder from being pressed to the outside and clogging the ventilation opening.

What is claimed is:

1. Extruder with a housing (1), in which at least one screw (2, 3) is pivotally supported, from its screw core (4) a land (5) which runs in a helical line protrudes, there being at least one ventilation opening (8) in the housing (1), at least in the area of at least one ventilation opening (8) the land (5) of the screw (2, 3) having an active flank (10) which is set back at least in areas relative to a radial plane which passes through the outside edge (14) of the active flank (10), wherein the active flank (10) has a radially outside segment (17) which with the axis of the screw (2, 3) encloses an acute angle (W°), and wherein the segment (18, 19) of the active flank (10) which lies radially inside is concavely shaped.

2. Extruder as claimed in claim 1, wherein the active flank (10) has a radially outside segment (17) which with the axis of the screw (2, 3) encloses an acute angle (W°), and wherein the segment (18, 19) of the active flank (10) which lies radially inside is concavely shaped.

3. Extruder as claimed in claim 1, wherein the radially outside segment (17) of the active flank (10) passes via a radius (18) into a segment (19) which is essentially perpendicular to the axis of the screw (2, 3) (FIG. 6).

4. Extruder as claimed in claim 3, wherein the passive flank (11) has segments (12, 13) which with the axis of the screw (2, 3) enclose different obtuse angles.

5. Extruder as claimed in claim 4, wherein the outside segment (12) of the passive flank (11) encloses with the axis of the screw (2, 3) a larger obtuse angle than the segment (13) of the passive flank (11), which segment adjoins inside.

6. Extruder as claimed in claim 1, wherein the active flank (10) of the land (5) of the screw (2, 3) has segments (20, 21) which with the axis of the screw (2, 3) enclose different angles.

7. Extruder as claimed in claim 6, wherein the passive flank (11) has segments (12, 13) which with the axis of the screw (2, 3) enclose different obtuse angles.

8. Extruder as claimed in claim 7, wherein the outside segment (12) of the passive flank (11) encloses with the axis of the screw (2, 3) a larger obtuse angle than the segment (13) of the passive flank (11), which segment adjoins inside.

9. Extruder as claimed in claim 1, wherein the passive flank (11) has segments (12, 13) which with the axis of the screw (2, 3) enclose different obtuse angles,
wherein the outside segment (12) of the passive flank (11) encloses with the axis of the screw (2, 3) a larger obtuse angle than the segment (13) of the passive flank (11), which segment adjoins inside.

10. Extruder as claimed in claim 9, wherein the outside segment (12) of the passive flank (11) encloses with the axis of the screw (2, 3) a larger obtuse angle than the segment (13) of the passive flank (11), which segment adjoins inside.

11. Extruder as claimed in claim 1, wherein the passive flank (11) has segments (12, 13) which with the axis of the screw (2, 3) enclose different obtuse angles.

12. Extruder as claimed in claim 11, wherein the outside segment (12) of the passive flank (11) encloses with the axis of the screw (2, 3) a larger obtuse angle than the segment (13) of the passive flank (11), which segment adjoins inside.

13. Extruder with a housing (1), in which at least one screw (2, 3) is pivotally supported, from its screw core (4) a land (5) which runs in a helical line protrudes, there being at least one ventilation opening (8) in the housing (1), at at least in the area of at least one ventilation opening (8) the land (5) of the screw (2, 3) having an active flank (10) which is set back at least in areas relative to a radial plane which passes through the outside edge (14) of the active flank (10),
wherein the active flank (10) of the land (5) of the screw (2, 3) has segments (20, 21) which with the axis of the screw (2, 3) enclose different angles.

14. Extruder as claimed in claim 13, wherein the radially outside segment (20) of the active flank (10) with the axis of the screw (2, 3) encloses an acute angle (W°) and the radially inside segment (21) of the active flank (10) with the axis of the screw (2, 3) encloses an obtuse angle.

15. Extruder as claimed in claim 14, wherein the obtuse angle which is enclosed by the radially inside segment (21) with the axis of the screw (2, 3) is 110° to 160°.

16. Extruder as claimed in claim 15, wherein the passive flank (11) has segments (12, 13) which with the axis of the screw (2, 3) enclose different obtuse angles.

17. Extruder as claimed in claim 16, wherein the outside segment (12) of the passive flank (11) encloses with the axis of the screw (2, 3) a larger obtuse angle than the segment (13) of the passive flank (11), which segment adjoins inside.

18. Extruder as claimed in claim 14, wherein the passive flank (11) has segments (12, 13) which with the axis of the screw (2, 3) enclose different obtuse angles.

19. Extruder as claimed in claim 18, wherein the outside segment (12) of the passive flank (11) encloses with the axis of the screw (2, 3) a larger obtuse angle than the segment (13) of the passive flank (11), which segment adjoins inside.

20. Extruder with a housing (1), in which at least one screw (2, 3) is pivotally supported, from its screw core (4) a land (5) which runs in a helical line protrudes, there being at least one ventilation opening (8) in the housing (1), at at least in the area of at least one ventilation opening (8) the land (5) of the screw (2, 3) having an active flank (10) which is set back at least in areas relative to a radial plane which passes through the outside edge (14) of the active flank (10),
wherein the passive flank (11) has segments (12, 13) which with the axis of the screw (2, 3) enclose different obtuse angles, and
wherein the outside segment (12) of the passive flank (11) encloses with the axis of the screw (2, 3) a larger obtuse angle than the segment (13) of the passive flank (11), which segment adjoins inside.

* * * * *